United States Patent
Liang

(10) Patent No.: US 12,224,405 B2
(45) Date of Patent: Feb. 11, 2025

(54) ELECTRODE ASSEMBLY, SECONDARY BATTERY, AND BATTERY-POWERED APPARATUS

(71) Applicant: CONTEMPORARY AMPEREX TECHNOLOGY (HONG KONG) LIMITED, Hong Kong (CN)

(72) Inventor: Tao Liang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 600 days.

(21) Appl. No.: 17/552,701

(22) Filed: Dec. 16, 2021

(65) Prior Publication Data

US 2022/0109193 A1   Apr. 7, 2022

Related U.S. Application Data

(63) Continuation of application No. PCT/CN2020/106469, filed on Jul. 31, 2020.

(30) Foreign Application Priority Data

Aug. 9, 2019   (CN) .......................... 201921291654.9

(51) Int. Cl.
*H01M 10/0587*   (2010.01)
*H01M 4/70*   (2006.01)
(Continued)

(52) U.S. Cl.
CPC ......... *H01M 10/0587* (2013.01); *H01M 4/70* (2013.01); *H01M 10/0431* (2013.01); *H01M 10/052* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2005/0142436 A1* | 6/2005 | Arai | H01G 11/22 429/211 |
| 2008/0241687 A1* | 10/2008 | Ishii | B60L 50/20 429/246 |
| 2011/0143201 A1* | 6/2011 | Takada | H01M 10/0587 429/233 |

FOREIGN PATENT DOCUMENTS

| | | |
|---|---|---|
| CN | 205944236 U | 2/2017 |
| CN | 207441856 U | 6/2018 |

(Continued)

OTHER PUBLICATIONS

Notice of Allowance issued on Dec. 31, 2019, in connection with corresponding Chinese Application No. 201921291654.9; 1 page.

(Continued)

*Primary Examiner* — Robert S Carrico
(74) *Attorney, Agent, or Firm* — Kilpatrick Townsend & Stockton LLP

(57) ABSTRACT

An electrode assembly, a secondary battery, and a battery-powered apparatus. The electrode assembly includes a negative electrode plate, a positive electrode plate, and a separator, and the negative electrode plate, the separator, and the positive electrode plate are laminated and wound around a winding center, where the negative electrode plate includes a first inner layer section, the positive electrode plate includes a second inner layer section, and the first inner layer section and the second inner layer section are immediately adjacent to the winding center; and the first inner layer section is provided with a notch portion, and the first inner layer section is disposed opposite the second inner layer section through the notch portion.

20 Claims, 12 Drawing Sheets

(51) Int. Cl.
*H01M 10/04* (2006.01)
*H01M 10/052* (2010.01)

(56) References Cited

FOREIGN PATENT DOCUMENTS

| | | | | | |
|---|---|---|---|---|---|
| CN | 208226027 | U | | 12/2018 | |
| CN | 209104247 | U | | 7/2019 | |
| CN | 210006850 | U | | 1/2020 | |
| CN | 112290031 | A | * | 1/2021 | ............ H01G 11/68 |
| JP | 11-265706 | A | | 9/1999 | |
| JP | 2000348754 | A | * | 12/2000 | |
| JP | 2002-75459 | A | | 3/2002 | |
| JP | 2011-138675 | A | | 7/2011 | |
| JP | 5018173 | B2 | * | 9/2012 | |
| KR | 10-2019-0040525 | A | | 4/2019 | |

OTHER PUBLICATIONS

International Search Report (with English Translation) and Written Opinion (with Machine Translation) issued on Nov. 2, 2020 in corresponding International Application No. PCT/CN2020/106469; 12 pages.

Extended Search Report issued May 9, 2022 in European Patent Application No. 20853485.9-1108/3940854 PCT/CN2020106469, 8 pgs.

* cited by examiner

ELECTRODE ASSEMBLY, SECONDARY BATTERY, AND BATTERY-POWERED APPARATUS

CROSS-REFERENCE TO RELATED APPLICATIONS

This application is a continuation of International Application No. PCT/CN2020/106469, filed on Jul. 31, 2020, which claims priority to Chinese Patent Application No. 201921291654.9, filed on Aug. 9, 2019 and entitled "ELECTRODE ASSEMBLY AND SECONDARY BATTERY", and both of the aforementioned applications are incorporated herein by reference in their entireties.

TECHNICAL FIELD

This application relates to the technical field of energy storage devices, and in particular, to an electrode assembly, a secondary battery, and a battery-powered apparatus.

BACKGROUND

A secondary battery mainly produces electrical energy through an electrode assembly. The electrode assembly includes a negative electrode plate, a positive electrode plate, and a separator separating the two, and the negative electrode plate, the separator, and the positive electrode plate are laminated and wound, forming a winding-type electrode assembly. During charging and discharging of the secondary battery, lithium ions undergo lithiation/delithiation between the negative electrode plate and the positive electrode plate, thereby producing electrical energy.

However, when the secondary battery is working, an active substance on one side of the negative electrode plate located in the innermost winding of the electrode assembly does not participate in lithiation/delithiation, which not only causes a waste of active materials and increases costs, but also increases the weight of the electrode assembly and reduces energy density of the secondary battery.

SUMMARY

In view of this, embodiments of this application provide an electrode assembly, a secondary battery, and a battery-powered apparatus, so as to resolve the prior-art problems of waste of active materials in the electrode assembly and lower energy density.

An embodiment of this application provides an electrode assembly, where the electrode assembly includes a negative electrode plate, a positive electrode plate, and a separator, and the negative electrode plate, the separator, and the positive electrode plate are laminated and wound around a winding center, where the negative electrode plate includes a first inner layer section, the positive electrode plate includes a second inner layer section, and the first inner layer section and the second inner layer section are immediately adjacent to the winding center; and the first inner layer section is provided with a notch portion, and the first inner layer section is disposed opposite the second inner layer section through the notch portion.

In a possible design, the first inner layer section includes a bending center in the length direction, and after winding, the first inner layer section is bent along the bending center; the notch portion includes a first notch portion and a second notch portion, and the first notch portion and the second notch portion are located on two sides of the bending center in the length direction; and the first notch portion and the second notch portion are arranged in the height direction of the electrode assembly.

In a possible design, the first inner layer section includes a first winding starting end, and the first notch portion runs through the first winding starting end in the length direction; and in the height direction, the first notch portion runs through one end of the first inner layer section, and the second notch portion runs through the other end of the first inner layer section.

In a possible design, in the height direction, the sum of the height of the first notch portion and the height of the second notch portion is greater than or equal to the height of the negative electrode plate.

In a possible design, the first inner layer section includes a first body portion, a second body portion, and a first connection portion, and the first body portion is connected to the second body portion through the first connection portion; and the first body portion is disposed opposite the second inner layer section through the first notch portion, and the second body portion is disposed opposite the second inner layer section through the second notch portion.

In a possible design, in the length direction, the second body portion includes a first winding starting end, and there is a first distance between the first winding starting end and the bending center; the second notch portion includes a side wall away from the bending center, and there is a second distance between the side wall and the bending center; and the first distance is less than or equal to the second distance.

In a possible design, in the height direction, the first body portion includes a first edge, the second body portion includes a second edge, and the first edge and the second edge are close to each other; the second inner layer section is provided with a third notch portion and a fourth notch portion, and the third notch portion and the fourth notch portion are located on two sides of the bending center in the length direction; and at least part of the first edge falls within the third notch portion, and at least part of the second edge falls within the fourth notch portion.

In a possible design, the second inner layer section includes a third body portion, a fourth body portion, and a second connection portion, and in the height direction, the third body portion and the fourth body portion are located on two sides of the third notch portion and the fourth notch portion; and the third body portion and the fourth body portion are connected to each other through the second connection portion, and the second connection portion is located between the third notch portion and the fourth notch portion.

In a possible design, the first connection portion is symmetric with respect to the bending center, and the second connection portion is symmetric with respect to the bending center; and the length of the first connection portion is greater than the length of the second connection portion in the length direction.

In a possible design, the height of the fourth body portion is less than the height of the second body portion in the height direction; and/or the height of the second body portion is less than or equal to the height of the second notch portion.

In a possible design, the second inner layer section is further provided with a fifth notch portion, and the fifth notch portion communicates with the fourth notch portion; the fifth notch portion extends in the height direction and runs through one end of the second inner layer section in the height direction; and at least part of the side wall falls within the fifth notch portion.

In addition, an embodiment of this application further provides a secondary battery, including: a housing having an opening and an accommodating cavity; an electrode assembly located in the accommodating cavity, where the electrode assembly is the electrode assembly described above; and a top cover assembly covering the opening.

An embodiment of this application further provides a battery-powered apparatus, including the secondary battery described above, where the secondary battery is configured to provide electrical energy.

BRIEF DESCRIPTION OF THE DRAWINGS

To describe the technical solutions in the embodiments of this application more clearly, the following briefly describes the accompanying drawings required for the embodiments. Apparently, the accompanying drawings in the following description show merely some embodiments of this application, and persons of ordinary skill in the art may derive other drawings from these accompanying drawings without creative efforts.

DETAILED DESCRIPTION OF THE EMBODIMENTS

For a better understanding of the technical solutions in this application, the following describes the embodiments of this application with reference to the accompanying drawings.

It should be specified that the described embodiments are merely some rather than all of the embodiments of this application. All other embodiments derived by persons of ordinary skill in the art based on the embodiments of this application without creative efforts fall within the scope of protection of this application.

The terms used in the embodiments of this application are for the purpose of describing specific embodiments only, and not for limiting this application. The singular forms preceded by "a/an", "the" and "this" used in the embodiments of this application and the appended claims are also intended to include their plural forms, unless otherwise specified expressly in the context.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally represents an "or" relationship between the associated objects.

It should be noted that the positional terms such as "up", "down", "left", and "right" described in the embodiments of this application are described as seen from the angles shown in the accompanying drawings, and should not be understood as limitations to the embodiments of this application. In addition, in the context, it should be further understood that when an element is referred to as being connected "above" or "under" another element, the element can not only be directly connected "above" or "under" the another element, but also be indirectly connected "above" or "under" the another element through an intermediate element.

Figure 1:
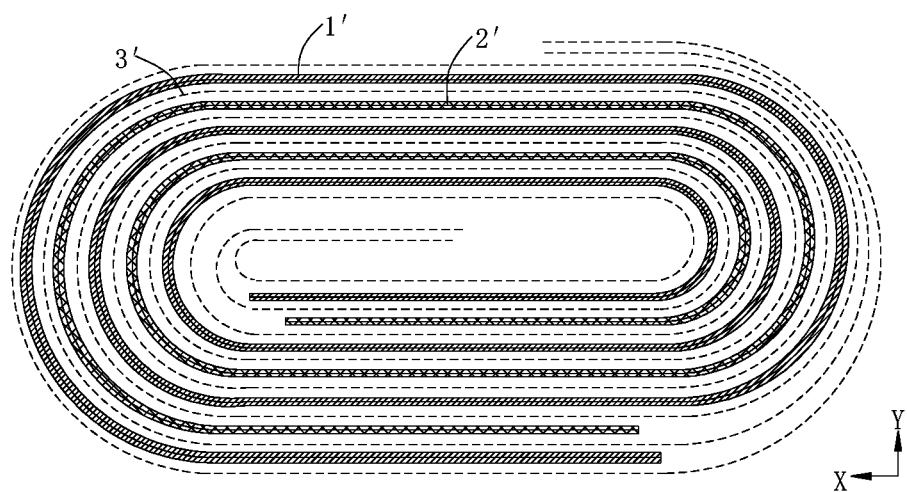
FIG. 1 is a sectional view of an electrode assembly in the prior art.
Figure 2:
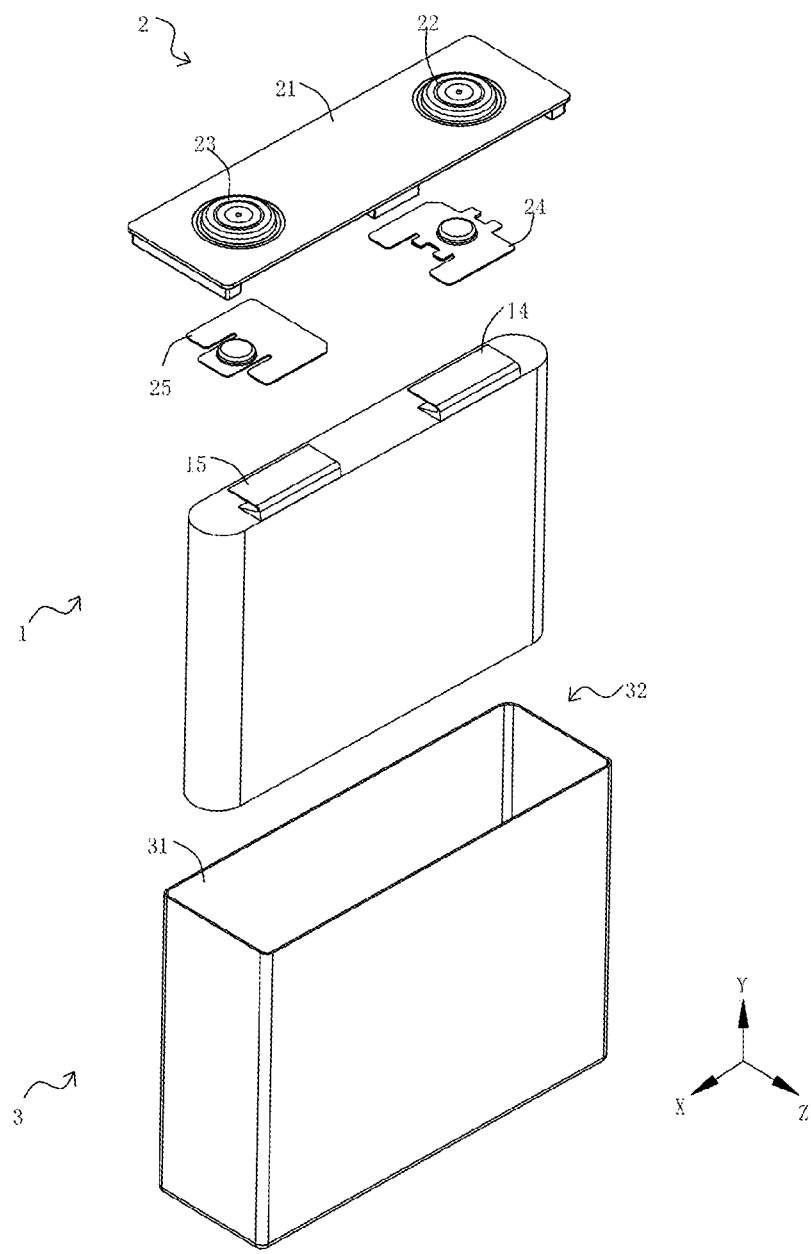
FIG. 2 is an exploded view of a secondary battery provided in this application in a specific embodiment.
Figure 3:
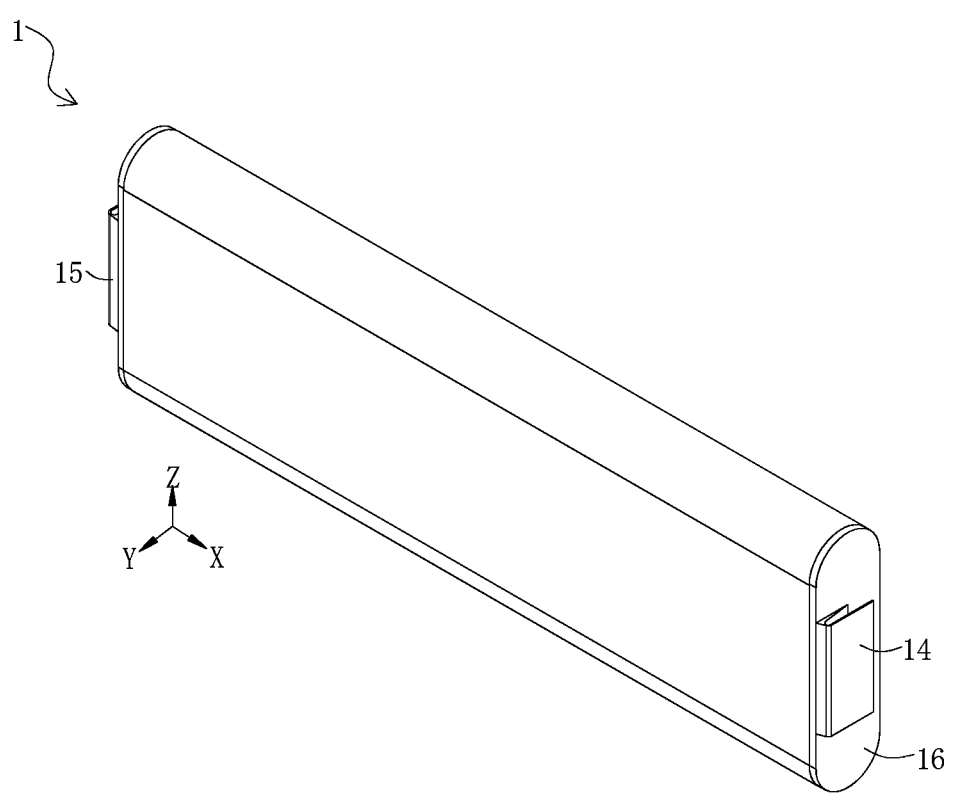
FIG. 3 is a schematic structural diagram of an electrode assembly in another specific embodiment.

Refer to FIG. 1 to FIG. 3, where FIG. 1 is a sectional view of an electrode assembly in the prior art; FIG. 2 is an exploded view of a secondary battery provided in this application in a specific embodiment; and FIG. 3 is a schematic structural diagram of an electrode assembly in another specific embodiment.

An embodiment of this application provides a secondary battery. As shown in FIG. 2, the secondary battery includes an electrode assembly 1, a top cover assembly 2, and a housing 3. The housing 3 may be a hexahedron or other shapes, and an accommodating cavity 32 is formed inside the housing 3 and configured to accommodate the electrode assembly 1 and an electrolyte. There is an opening 31 at one end of the housing 3, so that the electrode assembly 1 can be placed in the accommodating cavity 32 of the housing 3 through the opening 31. Moreover, one or more electrode assemblies 1 may be disposed in the accommodating cavity 32, and the plurality of electrode assemblies 1 are stacked on each other in the accommodating cavity 32. The housing 3 may include a metal material, such as aluminum or aluminum alloy, or may include an insulating material, such as plastic.

The top cover assembly 2 includes a top cover plate 21 and electrical connection terminals provided on the top cover plate 21. The top cover plate 21 is secured to the housing 3 of the secondary battery and covers the opening 31 of the housing 3, so that the electrode assembly 1 and the electrolyte are enclosed in the accommodating cavity 32 of the housing 3. The electrical connection terminals extend out of the top cover plate 21 and are electrically connected to tabs of the electrode assembly 1, so that the electrode assembly 1 can be charged and discharged through the electrical connection terminals. In other words, the secondary battery can output electrical energy through the electrical connection terminals. In addition, the secondary battery includes two electrical connection terminals: a negative electrical connection terminal 22 and a positive electrical connection terminal 23.

As shown in FIG. 2 and FIG. 3, the electrode assembly 1 includes an electrode cell and the tabs, and the electrode assembly 1 includes two tabs: a negative tab 14 and a positive tab 15. The negative tab 14 is electrically connected to the negative electrical connection terminal 22, and the positive tab 15 is electrically connected to the positive electrical connection terminal 23. In the embodiment shown in FIG. 3, in the length direction X, the electrode cell includes two side portions 16 that are disposed opposite each other. The two tabs extend from the respective two side portions 16 of the electrode cell, and the two tabs are connected to the corresponding electrical connection terminals via drainage components. Similarly, the drainage components include a negative drainage component and a positive drainage component. The negative drainage component connects the negative tab 14 and the negative electrical connection terminal 22, and the positive drainage component connects the positive tab 15 and the positive electrical connection terminal 23.

It should be noted that taking the housing 3 being a hexahedron as an example, the length direction of the secondary battery is the long side direction of the housing 3, corresponding to the X direction shown in FIG. 2; the thickness direction of the secondary battery is the short side direction of the housing 3, corresponding to the Y direction shown in FIG. 2; and the height direction of the secondary battery is perpendicular to the length direction and the thickness direction, corresponding to the Z direction shown in FIG. 2.

In another possible design, as shown in FIG. 2, the two tabs extend from the top of the electrode cell, and the two tabs are electrically connected to the corresponding electrical connection terminals via adapting sheets. Similarly, the adapting sheets include a negative electrode adapting sheet 24 and a positive electrode adapting sheet 25. The negative electrode adapting sheet 24 connects the negative tab 14 and the negative electrical connection terminal 22, and the positive electrode adapting sheet 25 connects the positive tab 15 and the positive electrical connection terminal 23.

Figure 4:
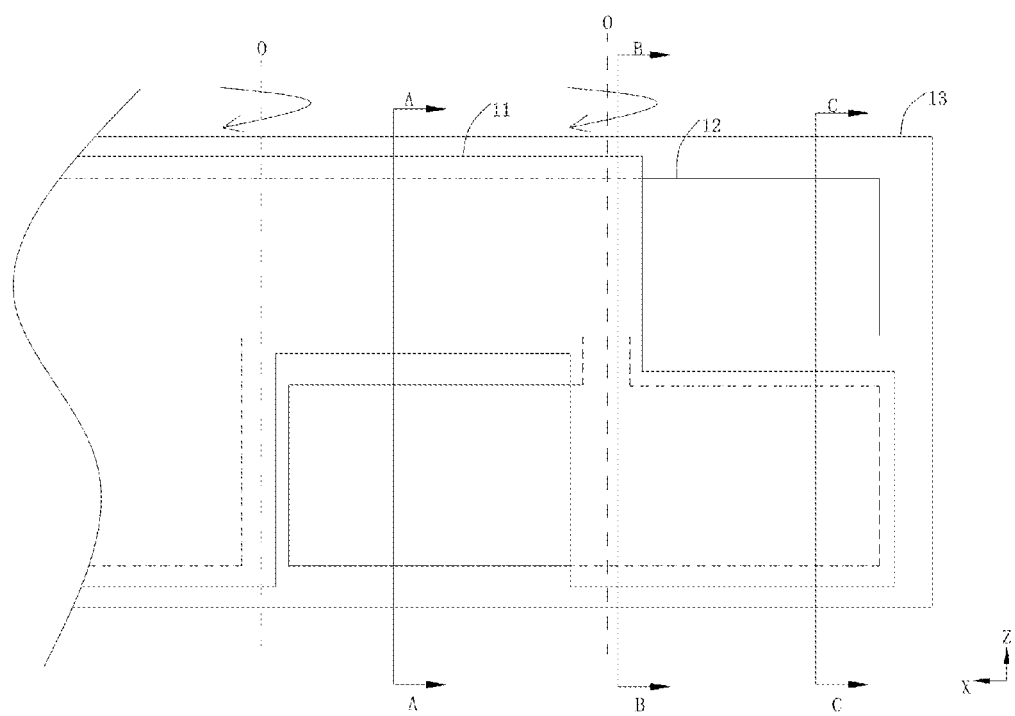
FIG. 4 is a partial expanded view of a negative electrode plate, a positive electrode plate, and a separator in a first specific embodiment.

In the electrode assembly 1, as shown in FIG. 4, the electrode cell includes a negative electrode plate 11, a positive electrode plate 12, and a separator 13. The separator 13 is located between a negative electrode plate 11 and a next positive electrode plate 12 to separate the negative electrode plate 11 from the positive electrode plate 12.

In a possible design, the negative electrode plate 11, the separator 13, and the positive electrode plate 12 are sequentially stacked to form an electrode cell of the electrode assembly 1, and the electrode cell is a laminated-type structure. In another possible design, as shown in FIG. 4, the negative electrode plate 11, the separator 13, and the positive electrode plate 12 are sequentially stacked and wound around a winding center to form an electrode cell of the electrode assembly 1, that is, the electrode cell is a winding-type structure. In addition, the electrode cell is formed with a gap, through which an electrolyte can enter the electrode cell and infiltrate into the negative electrode plate 11 and the positive electrode plate 12.

The negative electrode plate 11 includes a negative electrode current collector (such as copper foil) and a negative electrode active material layer (such as graphite, carbon, or silicon) coating the surface of the negative electrode current collector, and the positive electrode plate 12 includes a positive electrode current collector (such as aluminum foil) and a positive electrode active material layer (such as a ternary material, lithium iron phosphate or lithium cobaltate) coating the surface of the positive electrode current collector. At a negative electrode of the electrode assembly 1, the negative tab 14 is connected to the negative electrode plate 11 and extends from the electrode cell, and the negative tab 14 may be directly formed by cutting the negative electrode current collector; and at a positive electrode of the electrode assembly 1, the positive tab 15 is connected to the positive electrode plate 12 and extends from the electrode cell, and the positive tab 15 may be directly formed by cutting the positive electrode current collector.

In an electrode assembly in the prior art, a negative electrode plate 1', a positive electrode plate 2', and a separator 3' are laminated and wound to form an electrode assembly shown in FIG. 1. It can be learned from FIG. 1 that, in the electrode assembly, the negative electrode plate 1' located in the innermost winding faces the negative electrode plate 1' instead of the positive electrode plate 2', that is, an active substance on one side of the negative electrode plate 1' located in the innermost winding does not participate in lithiation/delithiation, producing no electrical energy. Therefore, the negative electrode plate 1' located in the innermost winding not only causes a waste of active materials, but also increases the weight of the electrode assembly and reduces energy density of the secondary battery. This application mainly resolves this technical problem by improving structures of the negative electrode plate and the positive electrode plate.

Figure 5:
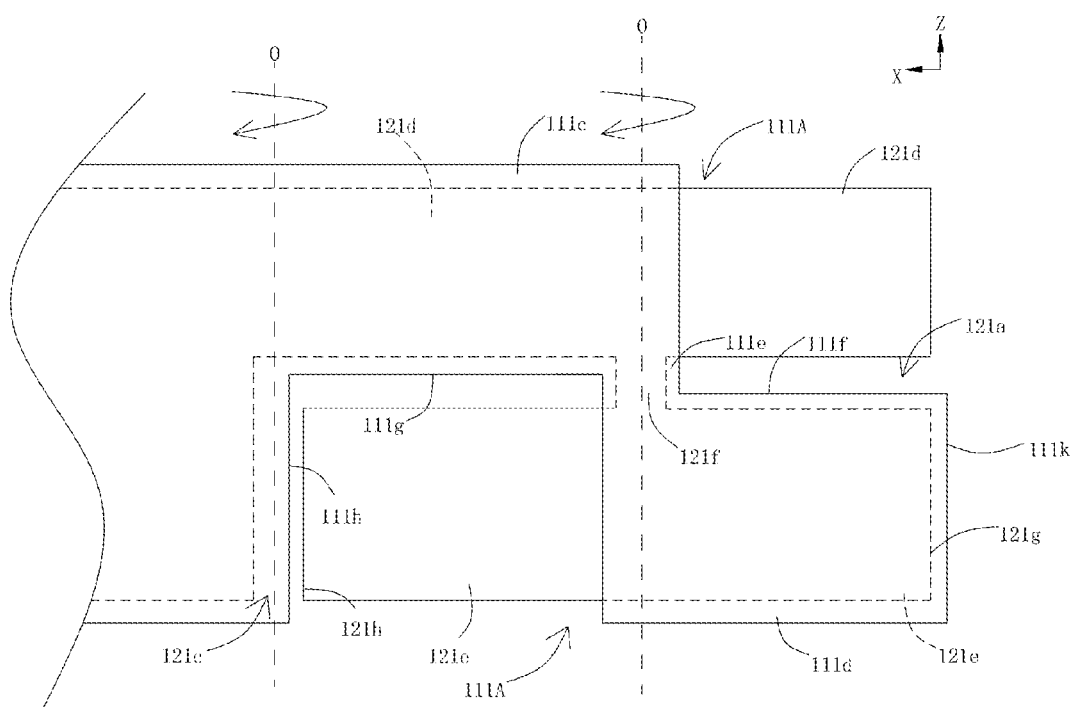
FIG. 5 is a schematic structural diagram of FIG. 4 after removal of the separator.
Figure 6:
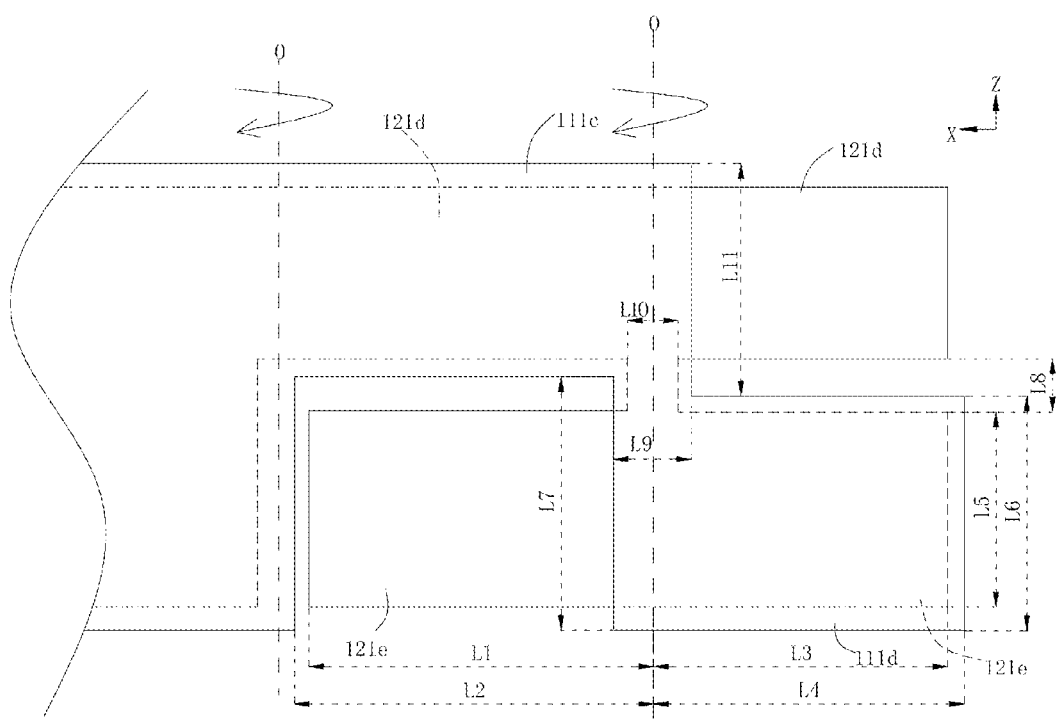
FIG. 6 is a schematic diagram of dimensions of some of the structures in FIG. 5.
Figure 7:
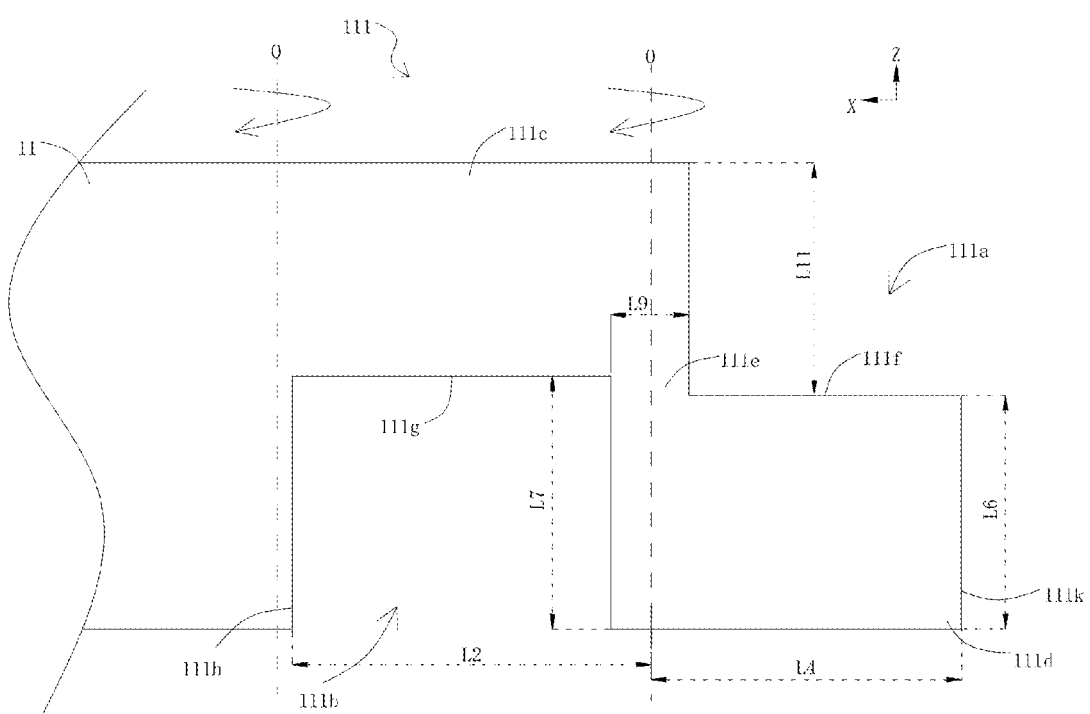
FIG. 7 is a schematic structural diagram of the negative electrode plate in FIG. 4 in a first specific embodiment.
Figure 8:
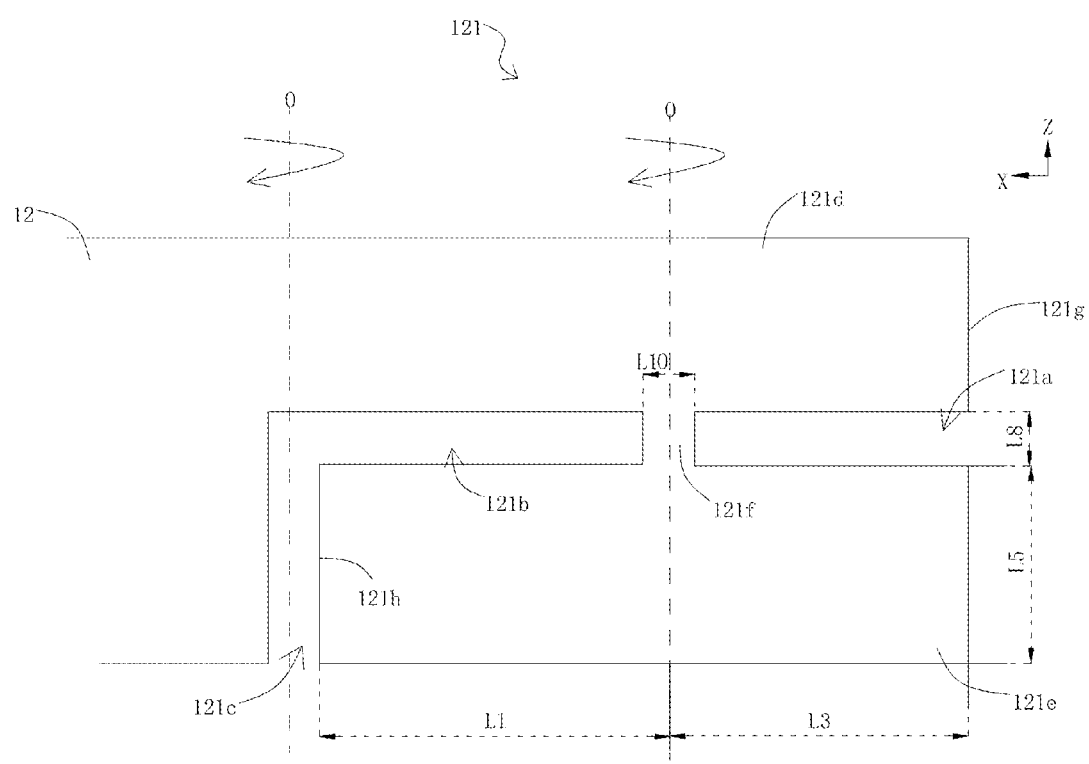
FIG. 8 is a schematic structural diagram of the positive electrode plate in FIG. 4 in a first specific embodiment.
Figure 9:
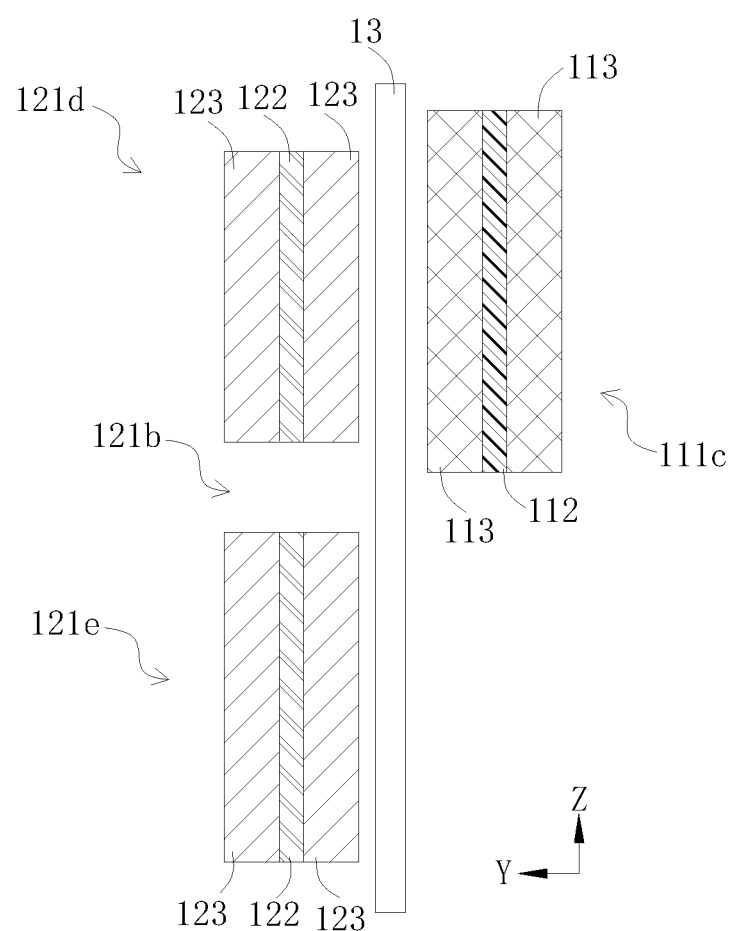
FIG. 9 is an A-A sectional view of FIG. 4.
Figure 10:
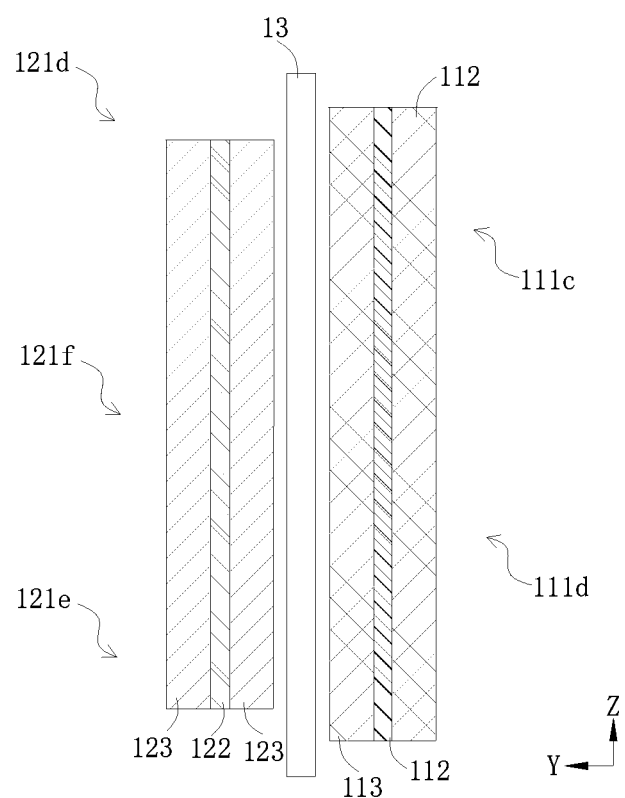
FIG. 10 is a B-B sectional view of FIG. 4.
Figure 11:
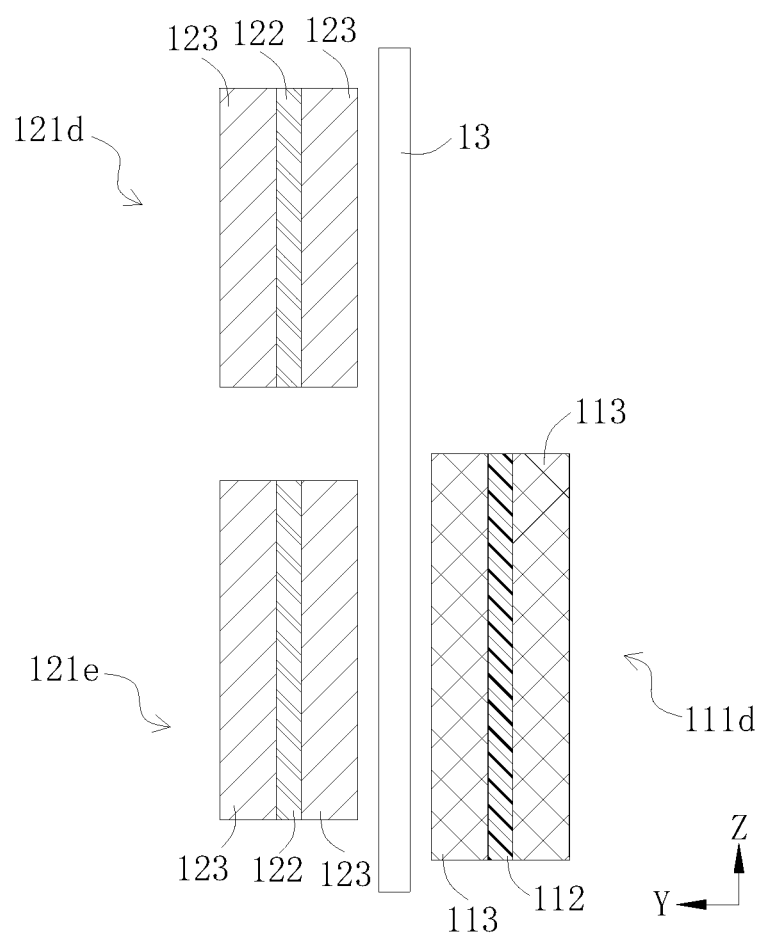
FIG. 11 is a C-C sectional view of FIG. 4.
Figure 12:
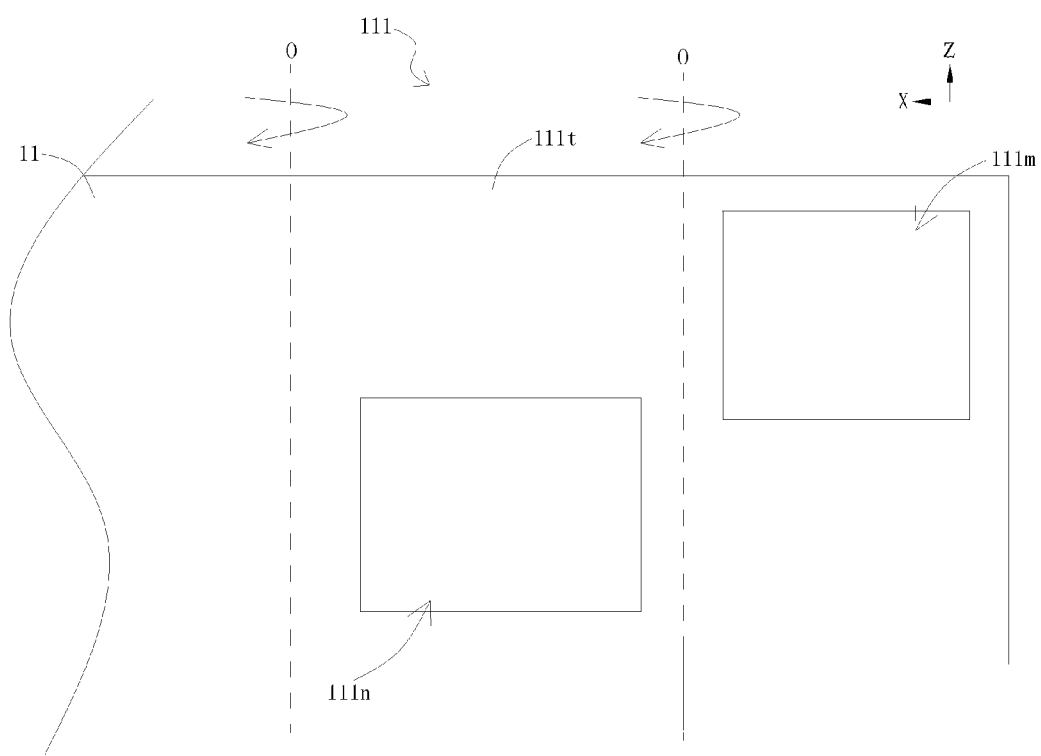
FIG. 12 is a schematic structural diagram of the negative electrode plate in a second specific embodiment.

Continue to refer to FIG. 4 to FIG. 12, where FIG. 4 is a partial expanded view of a negative electrode plate, a positive electrode plate, and a separator in a first specific embodiment; FIG. 5 is a schematic structural diagram of FIG. 4 after removal of the separator; FIG. 6 is a schematic diagram of dimensions of some of the structures in FIG. 5; FIG. 7 is a schematic structural diagram of the negative electrode plate in FIG. 4 in a first specific embodiment; FIG. 8 is a schematic structural diagram of the positive electrode plate in FIG. 4 in a first specific embodiment; FIG. 9 is an A-A sectional view of FIG. 4; FIG. 10 is a B-B sectional view of FIG. 4; FIG. 11 is a C-C sectional view of FIG. 4; and FIG. 12 is a schematic structural diagram of the negative electrode plate in a second specific embodiment.

As shown in FIG. 4, FIG. 4 shows a stacked structure of the negative electrode plate 11, the positive electrode plate 12, and the separator 13. As can be learned from FIG. 4, lamination positions of the three, the edges of the negative electrode plate 11 extend beyond the edges of the positive electrode plate 12, and the edges of the separator 13 extend beyond the edges of the negative electrode plate 11. After lamination, the negative electrode plate 11, the positive electrode plate 12, and the separator 13 are wound around the winding center, thereby forming the electrode assembly 1.

After winding, the negative electrode plate 11 includes a first inner layer section 111, and the positive electrode plate 12 includes a second inner layer section 121. The first inner layer section 111 and the second inner layer section 121 are immediately adjacent to a winding center line O. Therefore, after the winding is completed, the first inner layer section 111 is a section of the negative electrode plate 11 located in the innermost winding, and the second inner layer section 121 is a section of the positive electrode plate 12 located in the innermost winding. Moreover, the first inner layer section 111 is disposed opposite the second inner layer section 121, so that lithiation/delithiation occurs between them.

Specifically, as shown in FIG. 4 to FIG. 7, the first inner layer section 111 is provided with a notch portion 111A, and the notch portion 111A runs through the first inner layer section 111 in the width direction Y (the direction along which the negative electrode plate 11, the positive electrode plate 12, and the separator 13 are laminated). Therefore, after the first inner layer section 111 and the second inner layer section 121 are wound, the first inner layer section 111 is disposed opposite the second inner layer section 121 through the notch portion 111A.

It should be noted that, in the negative electrode plate 11, a structure of the first inner layer section 111 after the notch portion 111A is provided is a body portion.

In this application, the first inner layer section 111 of the negative electrode plate 11 is provided with the notch portion 111A, so that the second inner layer section 121 of the positive electrode plate 12 is exposed through the notch portion 111A. Therefore, after the winding, in the electrode assembly, the second inner layer section 121 exposed through the notch portion 111A is disposed opposite the body portions of the first inner layer section 111. In other words, the first inner layer section 111 and the second inner layer section 121 are disposed opposite each other through the notch portion 111A, and lithiation/delithiation occurs between the first inner layer section 111 and the second inner layer section 121. Therefore, in this application, by providing the notch portion 111A, the area of the first inner layer section 111 can be reduced, and the reduced part (the notch portion 111A) is a part that does not participate in lithiation/delithiation, thereby not only avoiding the waste of active materials, but also avoiding the decrease in energy density caused by the excessively large area of the negative electrode plate 11.

It should be noted that, for the first inner layer section 111 of the negative electrode plate 11 and the second inner layer section 121 of the positive electrode plate 12 shown in FIG. 5, after the winding, both the first inner layer section 111 and the second inner layer section 121 are located in the innermost winding of the negative electrode plate 11 and the positive electrode plate 12. Therefore, two parts of the first inner layer section 111 in the length direction X are bent towards each other, and two parts of the second inner layer section 121 in the length direction X are bent towards each other. Therefore, the dashed line O at the rightmost shown in FIG. 5 represents a bending center line O for the first inner layer section 111 and the second inner layer section 121.

In a possible design, as shown in FIG. 5 and FIG. 7, the notch portion 111A includes a first notch portion 111a and a second notch portion 111b. In the length direction X, the first notch portion 111a and the second notch portion 111b are located on two sides of the bending center line O, and the second inner layer section 121 of the positive electrode plate 12 is partially exposed through the first notch portion 111a and the second notch portion 111b. Correspondingly, the body portions of the first inner layer section 111 include a first body portion 111c and a second body portion 111d. In the length direction X, the first body portion 111c and the second body portion 111d are located on two sides of the bending center line O, and are connected through a first connection portion 111e, so that the negative electrode plate 11 is an integral structure.

In this electrode assembly, after the winding, the first body portion 111c is disposed opposite an exposed part of the second inner layer section 121 through the first notch portion 111a, so that lithiation/delithiation occurs between them; and the second body portion 111d is disposed opposite an exposed part of the second inner layer section 121 through the second notch portion 111b, so that lithiation/delithiation occurs between them.

In addition, the first notch portion 111a and the second notch portion 111b are arranged in the height direction Z of the electrode assembly 1, and correspondingly, the first body portion 111c and the second body portion 111d are arranged in the height direction Z of the electrode assembly 1.

In this embodiment, the first inner layer section 111 is provided with the two notch portions: the first notch portion 111a and the second notch portion 111b, and the two notch portions are connected via a body portion, ensuring that after being provided with the two notch portions, the first inner layer section 111 is still an integral structure, and ensuring that the negative electrode plate 11 has relatively high structural strength. In addition, when the two notch portions are located on two sides of the bending center line O and distributed in the height direction Z, compared with the two notch portions being disposed on the same side of the bending center line O, the disposition in this embodiment results in relatively large heights of the first notch portion 111a and the second notch portion 111b. That is, the sum of the heights of the two notch portions can be greater than or equal to the height of the negative electrode plate 11, while ensuring the integrity of the negative electrode plate 11. In other words, this embodiment allows for a relatively large area of the notch portions, thereby further reducing the waste of active materials, and further improving the energy density.

Specifically, as shown in FIG. 7, in the height direction Z, the first notch portion 111a includes a first edge 111f, the second notch portion 111b includes a second edge 111g, and the first edge 111f and the second edge 111g are close to each other (both of them are located on the inner side of the negative electrode plate 11 in the height direction Z). The first edge 111f is the lower edge of the first notch portion 111a, the second edge 111g is the upper edge of the second notch portion 111b, and the first edge 111f (the lower edge) is aligned with the second edge 111g (the upper edge), that is, the sum of the heights of the two notch portions is the same as the height of the negative electrode plate 11. Alternatively, the first edge 111f (the lower edge) is lower than the second edge 111g (the upper edge), that is, the sum of the heights of the two notch portions is greater than the height of the negative electrode plate 11, and the height of at least one of the two notch portions is greater than half of the height of the negative electrode plate 11, resulting in a relatively large area of the notch portions.

In a possible design, in the height direction Z, the height L11 of the first notch portion 111a is ¼ to ½ of the height of the first inner layer section 111 (the height of the negative electrode plate 11); and similarly, in the height direction Z, the height L7 of the second notch portion 111b is ¼ to ½ of the height of the first inner layer section 111 (the height of the negative electrode plate 11). Therefore, in this embodiment, the sum of the heights of the two notch portions is less than the height of the negative electrode plate 11, that is, in this embodiment, the area of the body portions of the first inner layer section 111 is larger, so that the first inner layer section 111 has a sufficient area for lithiation/delithiation.

More specifically, as shown in FIG. 7, in the length direction X, the first notch portion 111a runs through a first winding starting end 111k of the first inner layer section 111, and the negative electrode plate 11 includes two end portions in the winding direction: the first winding starting end 111k and a first winding terminating end, where the first winding starting end 111k is the inner end of the negative electrode plate 11 after the winding, and the first winding terminating end is the outer end of the negative electrode plate 11 after the winding. In addition, in the height direction Z, the first notch portion 111a runs through one end of the first inner layer section 111, and the second notch portion 111b runs through the other end of the first inner layer section 111.

In this embodiment, the first notch portion 111a is a structure that runs through on two sides (in the length direction X and the height direction Z), and the second notch portion 111b is a structure that runs through on one side (in the height direction Z). Therefore, the area of the two notch portions is relatively large, while ensuring lithiation/delithiation. In addition, the two notch portions may be rectangular structures, and a notch portion of this structure has the advantages of simple structure, convenient processing, and easy control.

In a possible design, as shown in FIG. 7, in the length direction X, there is a first distance L4 between the first winding starting end 111k of the second body portion 111d of the first inner layer section 111 and the bending center line O; and in the length direction X, the second notch portion 111b includes a side wall 111h away from the bending center line O, and there is a second distance L2 between the side wall 111h and the bending center line O, where the first distance L4 is less than or equal to the second distance L2.

As described above, after the first inner layer section 111 is bent around the bending center line O, the second body portion 111d of the first inner layer section 111 is disposed opposite the second notch portion 111b. In this embodiment, when the first distance L4 is less than or equal to the second distance L2, after the winding, the side wall 111h extends beyond the first winding starting end 111k, and the first winding starting end 111k of the second body portion 111d is within the second notch portion 111b, that is, the second body portion 111d does not extend beyond the second notch portion 111b, thereby preventing the negative electrode plate 11 at this position from overlapping after the winding, reducing the thickness of the electrode assembly, and increasing the energy density of the secondary battery.

The foregoing description is the general structure of the first inner layer section 111 in a specific embodiment. The specific structure of the first inner layer section 111 is set for the purpose of reducing an area of the negative electrode plate 11 that does not participate in lithiation/delithiation. For this purpose, the first inner layer section 111 may be set as various structures. In addition, after the first inner layer section 111 and the second inner layer section 121 are laminated and wound, the following preconditions need to be met: at various positions, the edges of the first inner layer section 111 extend beyond the edges of the second inner layer section 121, thereby ensuring that lithium ions de-intercalated from the positive electrode plate 12 can be intercalated into the opposite negative electrode plate 11 to avoid lithium precipitation. In order to meet this condition, the first inner layer section 111 and the second inner layer section 121 further have the following features:

As shown in FIG. 8, in the positive electrode plate 12, the second inner layer section 121 includes a third notch portion 121a and a fourth notch portion 121b, and in the length direction X, the third notch portion 121a and the fourth notch portion 121b are located on two sides of the bending center line O. As shown in FIG. 5, at least part of the first edge 111f of the first notch portion 111a falls within the third notch portion 121a, and at least part of the second edge 111g of the second notch portion 111b falls within the fourth notch portion 121b.

As shown in FIG. 5, after the second inner layer section 121 is provided with the third notch portion 121a and the fourth notch portion 121b, the edge of the negative electrode plate 11 extends beyond the edge of the positive electrode plate 12 in the length direction X, and the edge of the negative electrode plate 11 extends beyond the edge of the positive electrode plate 12 in the height direction Z, so that the edges of the negative electrode plate 11 extend beyond the edges of the positive electrode plate 12.

Specifically, as shown in FIG. 8, both the third notch portion 121a and the fourth notch portion 121b are rectangular structures, and the rectangular notch portions can accommodate the first edge 111f and the second edge 111g of the first inner layer section 111. In addition, because the first edge 111f and the second edge 111g are substantially aligned in the height direction Z, the third notch portion 121a and the fourth notch portion 121b are also substantially at the same height, and the heights of the two notch portions may be the same or different. In the height direction Z, the heights L8 of the third notch portion 121a and the fourth notch portion 121b range from 3 mm to 8 mm, and may be specifically 5 mm, 6 mm, or the like.

It can be understood that when the heights L8 of the third notch portion 121a and the fourth notch portion 121b are too small, the positive electrode plate 12 at this position may extend beyond the negative electrode plate 11, affecting the normal operation of the electrode assembly 1; and when the heights L8 of the third notch portion 121a and the fourth notch portion 121b are too large, the area of the positive electrode plate 12 that participates in lithiation/delithiation is too small, affecting the efficiency of lithiation/delithiation. Therefore, in this embodiment, the heights L8 of the third notch portion 121a and the fourth notch portion 121b may be set properly in consideration of the two factors above.

In addition, in the positive electrode plate 12, the heights L8 of the third notch portion 121a and the fourth notch portion 121b may be the same or different. When the heights L8 of the two notch portions are the same, the processing difficulty of the positive electrode plate 12 can be reduced, and the structural complexity of the positive electrode plate 12 can be reduced.

In a possible design, as shown in FIG. 8, the second inner layer section 121 includes body portions and notch portions. The notch portions specifically include a third notch portion 121a and a fourth notch portion 121b, and the body portions specifically include a third body portion 121d, a fourth body portion 121e, and a second connection portion 121f. In the height direction Z, the third body portion 121d and the fourth body portion 121e are located on two sides of the third notch portion 121a and the fourth notch portion 121b. To be specific, the third body portion 121d and the fourth body portion 121e are separated by the third notch portion 121a and the fourth notch portion 121b, and the second connection portion 121f is located between the third notch portion 121a and the fourth notch portion 121b, so that the second connection portion 121f connects the third body portion 121d and the fourth body portion 121e, so as to connect the second inner layer section 121 as a whole after the notch portions are provided.

As shown in FIG. 5 and FIG. 6, the first connection portion 111e and the second connection portion 121f are laminated on each other, and after the winding, their positions are opposite, that is, lithiation/delithiation occurs between them. In the length direction X, the first connection portion 111e is symmetric with respect to the bending center line O, and the second connection portion 121f is symmetric with respect to the bending center line O.

In addition, in the length direction X, the length L9 of the first connection portion 111e is greater than the length L10 of the second connection portion 121f, that is, at the positions of the two connection portions, the edges of the negative electrode plate 11 extend beyond the edges of the positive electrode plate 12.

In a possible design, as shown in FIG. 8, in the length direction X, the third body portion 121d (or the fourth body portion 121e) includes two opposite edges, and distances between the two edges and the bending center line O are a third distance L1 and a third distance L3, respectively. In this embodiment, the third body portion 121d is symmetric with respect to the bending center line O. Therefore, the distances between the two edges of the third body portion 121d in the length direction X and the bending center line O is the same, that is, L1=L3. In this case, after the winding, two ends of the third body portion 121d are aligned. In addition, the structure and size of the fourth body portion 121e are the same as those of the third body portion 121d. Therefore, after the winding, two ends of the fourth body portion 121e are aligned, that is, the positive electrode plate 12 has no overlapping part at this position, thereby reducing the thickness of the electrode assembly 1.

The foregoing third distance L3 or L1 is less than the first distance L4, where the first distance L4 is the distance between the first winding starting end 111k of the second body portion 111d of the first inner layer section 111 and the bending center line O. When the third distance L3 or L1 is less than the first distance L4, it means that the edge of the negative electrode plate 11 extends beyond the edge of the positive electrode plate 12 at the winding starting end.

In a possible design, as shown in FIG. 8, the second inner layer section 121 further includes a fifth notch portion 121c, the fifth notch portion 121c communicates with the fourth notch portion 121b, and the fifth notch portion 121c extends in the height direction Z and runs through one end of the second inner layer section 121 in the height direction Z, that is, the fifth notch portion 121c runs through the lower surface of the second inner layer section 121. As described above, in the first inner layer section 111, the second notch portion 111d includes the side wall 111h away from the bending center line O. In the second inner layer section 121, in the length direction X, the fourth body portion 121e includes two edges away from the bending center, and the two edges are a second winding starting end 121g and a third edge 121h of the fourth body portion 121e.

After the negative electrode plate 11 and the positive electrode plate 12 are laminated, the first winding starting end 111k of the second body portion 111d extends beyond the second winding starting end 121g of the fourth body portion 121e. In addition, after the second inner layer section 121 is provided with the fifth notch portion 121c, at least part of the side wall 111h falls within the fifth notch portion 121c. Therefore, after the winding, the first winding starting end 111k extends beyond the third edge 121h, that is, at this position, the edge of the negative electrode plate 11 extends beyond the edge of the positive electrode plate 12.

Through the design above, in the length direction X, the edges of the negative electrode plate 11 extend beyond the edges of the positive electrode plate 12.

On the other hand, as shown in FIG. 6, in the first inner layer section 111, the height L6 of the second body portion 111d is less than or equal to the height L7 of the second notch portion 111b. Because the lower edges of them are aligned in the height direction Z, the upper edge of the second notch portion 111b is higher than the upper edge of the second body portion 111d, that is, the area of the second notch portion 111b is greater than the area of the second body portion 111d, so that after the winding, the second body portion 111d can be completely exposed through the second notch portion 111b.

After the winding, the fourth body portion 121e of the positive electrode plate 12 and the second body portion 111d are disposed opposite each other through the second notch portion 111d. In the height direction Z, the height L5 of the fourth body portion 121e is less than the height L6 of the second body portion 111d, and in the height direction Z, the two edges of the second body portion 111d extend beyond the two edges of the fourth body portion 121e.

In addition, relationships between the height of the first body portion 111c and the height of the first notch portion 111a, and between the first body portion 111c and the third body portion 121d are similar thereto. The following conditions need to be met: the first body portion 111c can be completely exposed through the first notch portion 111a, and after the winding, the edge of the first body portion 111c extends beyond the edge of the third body portion 121d.

Therefore, with the disposition in this embodiment, in the height direction Z, the edges of the negative electrode plate 11 extend beyond the edges of the positive electrode plate 12.

In the foregoing embodiments, the negative electrode plate 11 includes a first substrate 112 and a first active material layer 113 coating the surface of the first substrate 112, and the positive electrode plate 12 includes a second substrate 122 and a second active material layer 123 coating the surface of the second substrate 122.

FIG. 9 is an A-A sectional view of FIG. 4. As shown in FIG. 9, the negative electrode plate 11, the positive electrode plate 12, and the separator 13 are laminated. It can be learned from FIG. 9 that in the negative electrode plate 11, both sides of the first substrate 112 in the width direction Y are coated with the first active material layer 113, and both sides of the second substrate 122 in the width direction Y are coated with the second active material layer 123. In addition, the negative electrode plate 11 at this position is provided with the second notch portion 111b. Therefore, the first body portion 111c of the negative electrode plate is disposed opposite the third body portion 121d of the positive electrode plate 12, and in the height direction Z, both ends of the first body portion 111c extend beyond both ends of the third body portion 121d.

FIG. 10 is a B-B sectional view of FIG. 4. As shown in FIG. 10, the negative electrode plate 11 at this section includes the first body portion 111c, the second body portion 111d, and the first connection portion 111e; the positive electrode plate 12 at this section includes the third body portion 121d, the fourth body portion 121e, and the second connection portion 121f; and in the height direction Z, both ends of the negative electrode plate 11 extend beyond both ends of the positive electrode plate 12.

FIG. 11 is a C-C sectional view of FIG. 4. It can be learned from FIG. 11 that, the negative electrode plate 11 at this section includes the second body portion 111d, the positive electrode plate 12 at this section includes the third body portion 121d and the fourth body portion 121e, and there is the third notch portion 121a between them. The second body portion 111d is disposed opposite the fourth body portion 121e, and in the height direction Z, both ends of the second body portion 111d extend beyond both ends of the fourth body portion 121e.

In addition, it can be learned from FIG. 9 to FIG. 11 that, the separator 13 extends beyond the edges of the negative electrode plate 11 and the positive electrode plate 12.

In another possible design, as shown in FIG. 12, in the electrode assembly 1, the first inner layer section 111 is provided with a through hole, and a remaining structure is a main body portion 111t after the first inner layer section 111 is provided with the through hole. After the winding, the main body portion 111t is disposed opposite the second inner layer section 121 through the through hole.

In this embodiment, the first inner layer section 111 of the negative electrode plate 11 is provided with the through hole, so that the second inner layer section 121 of the positive electrode plate 12 is exposed through the through hole. Therefore, after the winding, in the electrode assembly 1, the second inner layer section 121 exposed through the through hole is disposed opposite the main body portion 111t of the first inner layer section 111. In other words, the first inner layer section 111 and the second inner layer section 121 are disposed opposite each other through the through hole, and lithiation/delithiation occurs between the first inner layer section 111 and the second inner layer section 121. Therefore, by providing the through hole, the area of the first inner layer section 111 can be reduced, and the reduced part (through hole) is a part that does not participate in lithiation/delithiation, thereby not only avoiding the waste of active materials, but also avoiding the decrease in energy density caused by the excessively large area of the negative electrode plate 11.

In a possible design, as shown in FIG. 12, in the first inner layer section 111, the through hole includes a first through hole 111m and a second through hole 111n. After the negative electrode plate 11 and the positive electrode plate 12 are laminated, a part of the second inner layer section 121 is exposed through the first through hole 111m and the second through hole 111n. In the electrode assembly, after the winding, the main body portion 111t is disposed opposite the exposed part of the second inner layer section 121 through the first through hole 111m and the second through hole 111n, so that lithiation/delithiation occurs between the first inner layer section 111 and the second inner layer section 121.

The first through hole 111m and the second through hole 111n communicate with each other through the main body portion 111t. In the length direction X, the first through hole 111m and the second through hole 111n are located on two sides of the bending center line O, and the first through hole 111m and the second through hole 111n are arranged in the height direction Z of the electrode assembly 1.

In this embodiment, the first inner layer section 111 is provided with the two through holes: the first through hole 111m and the second through hole 111n, and the two through holes are connected via the main body portion 111t, ensuring that after being provided with the two through holes, the first inner layer section 111 is still an integral structure, and ensuring that the negative electrode plate 11 has relatively high structural strength. In addition, when the two through holes are located on two sides of the bending center line O and distributed in the height direction Z, compared with the two through holes being disposed on the same side of the bending center line O, the disposition in this embodiment results in relatively large heights of the first through hole 111m and the second through hole 111n. That is, the sum of the heights of the two through holes can be greater than or equal to the height of the negative electrode plate 11, while ensuring the integrity of the negative electrode plate 11. In other words, this embodiment allows for a relatively large area of the through holes, thereby further reducing the waste of active materials, and further improving the energy density.

In addition, in this embodiment, a specific structure of the second inner layer section 121 of the positive electrode plate 12 is set depending on the first inner layer section 111, and dimensions of the through holes in the first inner layer section 111 and the second inner layer section 121 and the main body portion 111t are also designed depending on the first inner layer section 111. During design, the following conditions need to be met: the edges of the first inner layer section 111 extend beyond the edges of the second inner layer 121, and the overlapping of the first inner layer section 111 and the overlapping of the second inner layer section 121 are avoided as much as possible after the winding.

In this application, when the substrate layers of the negative electrode plate 11 and the positive electrode plate 12 are coated with active materials on both sides, the notch portions are provided in the first inner layer section 111, so that the negative electrode plate 11 avoids the waste of active materials, and a double-sided continuous coating method can be used, thereby reducing the difficulty of coating and improving production efficiency and yield. Moreover, the notch portions or through holes in the first inner layer section 111 can be formed by laser die cutting, which is simple and convenient to operate.

In addition, as described above, in this application, after the first inner layer section 111 is provided with the notch portion or through hole, its area is reduced by nearly one layer compared with the prior art, while the area of the second inner layer section 121 is not significantly reduced (only the notch portions with a small area are provided). Therefore, this disposition does not affect the energy performance of the secondary battery, and can ensure that the negative electrode plate 11 and the positive electrode plate 12 are always facing each other to avoid lithium precipitation. In addition, after the winding, the risk of overlapping of the negative electrode plate 11 and the positive electrode plate 12 can be reduced, so that the thickness of the largest face of the electrode assembly is consistent, thereby ensuring the evenness of force on the secondary battery, and ensuring relatively good performance of the secondary battery during use.

An embodiment of this application further provides a battery-powered apparatus, including the secondary battery described above, where the secondary battery is configured to provide electrical energy.

The battery-powered apparatus may be a vehicle. The vehicle may be a fuel-powered vehicle, a gas-powered vehicle, or a new energy vehicle. The new energy vehicle may be a battery electric vehicle, a hybrid electric vehicle, an extended-range electric vehicle, or the like.

The foregoing descriptions are merely preferred embodiments of this application, but are not intended to limit this application. Any modification, equivalent replacement, or improvement made without departing from the spirit and principle of this application shall fall within the scope of protection of this application.

What is claimed is:

1. A secondary battery, comprising:
 a housing having an opening and an accommodating cavity;
 an electrode assembly located in the accommodating cavity, wherein the electrode assembly comprises a negative electrode plate, a positive electrode plate, and a separator, and the negative electrode plate, the separator, and the positive electrode plate are laminated and wound around a winding center; and
 a top cover assembly covering the opening,
 wherein the negative electrode plate comprises a first inner layer section, the positive electrode plate comprises a second inner layer section, the first inner layer section comprises a negative electrode active material, the second inner layer section comprises a positive electrode active material, and the first inner layer section and the second inner layer section are immediately adjacent to the winding center; and
 the first inner layer section is provided with at least one notch portion, the at least one notch portion runs through the first inner layer section in a width direction, the first inner layer section is disposed opposite the second inner layer section, at least one portion the first inner layer section, at least one portion of the second inner layer section, and the at least one notch portion are at least partially aligned in the width direction, the at least one portion of the first inner layer section is exposed to the at least one notch portion and opposite the at least one portion of the second inner layer section through the at least one notch portion in the width direction.

2. The secondary battery according to claim 1, wherein the first inner layer section comprises a bending center in a length direction, and after winding, the first inner layer section is bent along the bending center;
the at least one notch portion comprises a first notch portion and a second notch portion, wherein the first notch portion and the second notch portion are located on two sides of the bending center in the length direction; and
the first notch portion and the second notch portion are arranged in a height direction of the electrode assembly.

3. The secondary battery according to claim 2, wherein the first inner layer section comprises a first winding starting end, and the first notch portion runs through the first winding starting end in the length direction; and
in the height direction, the first notch portion runs through one end of the first inner layer section, and the second notch portion runs through the other end of the first inner layer section.

4. The secondary battery according to claim 2, wherein in the height direction, a sum of the height of the first notch portion and the height of the second notch portion is greater than or equal to a height of the negative electrode plate.

5. The secondary battery according to claim 2, wherein the first inner layer section comprises a first body portion, a second body portion, and a first connection portion, wherein the first body portion is connected to the second body portion through the first connection portion; and
the first body portion is at least partially aligned with and exposed to the first notch portion, the first body portion is disposed opposite the at least one portion of the second inner layer section through the first notch portion, and the second body portion is at least partially aligned with and exposed to the second notch portion, the second body portion is disposed opposite the at least one portion of the second inner layer section through the second notch portion.

6. The secondary battery according to claim 5, wherein in the length direction, the second body portion comprises a first winding starting end, and there is a first distance between the first winding starting end and the bending center;
the second notch portion comprises a side wall away from the bending center, and there is a second distance between the side wall and the bending center; and
the first distance is less than or equal to the second distance.

7. The secondary battery according to claim 5, wherein in the height direction, the first body portion comprises a first edge, the second body portion comprises a second edge, and the first edge and the second edge are close to each other;
the second inner layer section is provided with a third notch portion and a fourth notch portion, and the third notch portion and the fourth notch portion are located on two sides of the bending center in the length direction; and
at least a part of the first edge is overlapped with the third notch portion in the width direction, and at least part of the second edge is overlapped with the fourth notch portion in the width direction.

8. The secondary battery according to claim 7, wherein the second inner layer section comprises a third body portion, a fourth body portion, and a second connection portion, and in the height direction, the third body portion and the fourth body portion are located on two sides of the third notch portion and the fourth notch portion;
the third body portion of the second inner layer section is disposed opposite the first body portion of the first inner layer section through the first notch portion, and the fourth body portion of the second inner layer section is disposed opposite the second portion of the first inner layer section through the second notch portion; and
the third body portion and the fourth body portion are connected to each other through the second connection portion, and the second connection portion is located between the third notch portion and the fourth notch portion.

9. The secondary battery according to claim 8, wherein the first connection portion is symmetric with respect to the bending center, and the second connection portion is symmetric with respect to the bending center; and
the length of the first connection portion is greater than the length of the second connection portion in the length direction.

10. The secondary battery according to claim 8, wherein a height of the fourth body portion is less than a height of the second body portion in the height direction; and/or
the height of the second body portion is less than or equal to a height of the second notch portion.

11. The electrode assembly according to claim 7, wherein the second inner layer section is further provided with a fifth notch portion, and the fifth notch portion communicates with the fourth notch portion;
the fifth notch portion extends in the height direction and runs through one end of the second inner layer section in the height direction; and
the second notch portion comprises a side wall away from the bending center, at least a part of the side wall is overlapped with the fifth notch portion in the width direction.

12. A battery-powered apparatus, comprising:
a secondary battery, the secondary battery comprising:
a housing having an opening and an accommodating cavity;
an electrode assembly located in the accommodating cavity, wherein the electrode assembly comprises a negative electrode plate, a positive electrode plate, and a separator, and the negative electrode plate, the separator, and the positive electrode plate are laminated and wound around a winding center,
wherein the negative electrode plate comprises a first inner layer section, the positive electrode plate comprises a second inner layer section, first inner layer section comprises a negative electrode active material, the second inner layer section comprises a positive electrode active material, and the first inner layer section and the second inner layer section are immediately adjacent to the winding center; and
the first inner layer section is provided with at least one notch portion, the at least one notch portion runs through the first inner layer section in a width direction, the first inner layer section is disposed opposite the second inner layer section, at least one portion the first inner layer section, at least one portion of the second inner layer section, and the at least one notch portion are at least partially aligned in the width direction, the at least one portion of the first inner layer section is exposed to the at least one notch portion and opposite the at least one portion of the second inner layer section through the at least one notch portion in the width direction; and a top cover assembly covering the opening, wherein the secondary battery is configured to provide electrical energy to the battery-powered apparatus.

13. The battery-powered apparatus according to claim 12, wherein the first inner layer section comprises a bending center in a length direction, and after winding, the first inner layer section is bent along the bending center;

the at least one notch portion comprises a first notch portion and a second notch portion, wherein the first notch portion and the second notch portion are located on two sides of the bending center in the length direction; and the first notch portion and the second notch portion are arranged in a height direction of the electrode assembly.

14. The battery-powered apparatus according to claim 13, wherein the first inner layer section comprises a first winding starting end, and the first notch portion runs through the first winding starting end in the length direction; and in the height direction, the first notch portion runs through one end of the first inner layer section, and the second notch portion runs through the other end of the first inner layer section.

15. The battery-powered apparatus according to claim 13, wherein in the height direction, a sum of the height of the first notch portion and the height of the second notch portion is greater than or equal to a height of the negative electrode plate.

16. The battery-powered apparatus according to claim 13, wherein the first inner layer section comprises a first body portion, a second body portion, and a first connection portion, wherein the first body portion is connected to the second body portion through the first connection portion; and the first body portion is at least partially aligned with and exposed to the first notch portion, the first body portion is disposed opposite the at least one portion of the second inner layer section through the first notch portion, and the second body portion is at least partially aligned with and exposed to the second notch portion, the second body portion is disposed opposite the at least one portion of the second inner layer section through the second notch portion.

17. The battery-powered apparatus according to claim 16, wherein in the length direction, the second body portion comprises a first winding starting end, and there is a first distance between the first winding starting end and the bending center;

the second notch portion comprises a side wall away from the bending center, and there is a second distance between the side wall and the bending center; and the first distance is less than or equal to the second distance.

18. The battery-powered apparatus according to claim 16, wherein in a height direction, the first body portion comprises a first edge, the second body portion comprises a second edge, and the first edge and the second edge are close to each other;

the second inner layer section is provided with a third notch portion and a fourth notch portion, and the third notch portion and the fourth notch portion are located on two sides of the bending center in a length direction; and at least a part of the first edge is overlapped with the third notch portion in the width direction, and at least part of the second edge is overlapped with the fourth notch portion in the width direction.

19. The battery-powered apparatus according to claim 18, wherein the at least one portion of the second inner layer section further comprises a third body portion, a fourth body portion, and a second connection portion, and in the height direction, the third body portion and the fourth body portion are located on two sides of the third notch portion and the fourth notch portion;

the third body portion of the second inner layer section is disposed opposite the first body portion of the first inner layer section through the first notch portion, and the fourth body portion of the second inner layer section is disposed opposite the second portion of the first inner layer section through the second notch portion; and the third body portion and the fourth body portion are connected to each other through the second connection portion, and the second connection portion is located between the third notch portion and the fourth notch portion.

20. The battery-powered apparatus according to claim 19, wherein the first connection portion is symmetric with respect to the bending center, and the second connection portion is symmetric with respect to the bending center;

the length of the first connection portion is greater than the length of the second connection portion in the length direction;

a height of the fourth body portion is less than a height of the second body portion in the height direction; and the height of the second body portion is less than or equal to a height of the second notch portion.

* * * * *